United States Patent [19]

Meuschke et al.

[11] Patent Number: 4,647,424
[45] Date of Patent: Mar. 3, 1987

[54] FUEL ASSEMBLY UNLATCHING AND HANDLING GRIPPER

[75] Inventors: Robert E. Meuschke, Penn Hills; Leonard P. Hornak, N. Huntingdon, both of Pa.

[73] Assignee: Westinghouse Electric Corp., Pittsburgh, Pa.

[21] Appl. No.: 552,230

[22] Filed: Nov. 16, 1983

[51] Int. Cl.$^4$ .................. G21C 19/20; G21C 19/16; G21C 3/12

[52] U.S. Cl. .................... 376/264; 376/268; 376/364

[58] Field of Search ........... 376/446, 268, 271, 262, 376/261, 364, 363

[56] References Cited

U.S. PATENT DOCUMENTS

| | | |
|---|---|---|
| 3,164,530 | 1/1965 | Banks . |
| 3,179,569 | 4/1965 | Fortescue et al. . |
| 3,549,491 | 12/1970 | Johnson . |
| 3,802,996 | 4/1974 | Jones . |
| 3,990,591 | 11/1976 | Street et al. .................. 376/271 X |
| 4,038,133 | 7/1977 | Bittermann et al. ............ 376/364 X |
| 4,086,132 | 4/1978 | Mouschke et al. .............. 376/271 |
| 4,139,315 | 2/1979 | Levy et al. ..................... 403/19 |
| 4,311,557 | 1/1982 | Kowalski et al. ............... 376/271 |
| 4,358,421 | 11/1982 | Jabsen .......................... 376/271 |
| 4,381,284 | 4/1983 | Gjertsen ........................ 376/364 |

FOREIGN PATENT DOCUMENTS

| | | | |
|---|---|---|---|
| 0935025 | 8/1963 | United Kingdom .............. 376/363 |
| 1159971 | 7/1969 | United Kingdom .............. 376/364 |
| 1216289 | 12/1970 | United Kingdom .............. 376/364 |
| 1216168 | 12/1970 | United Kingdom .............. 376/261 |
| 1226919 | 3/1971 | United Kingdom .............. 376/364 |
| 1548462 | 7/1979 | United Kingdom .............. 376/261 |
| 2036413 | 6/1980 | United Kingdom .............. 376/364 |
| 2038402 | 7/1980 | United Kingdom .............. 376/364 |
| 2060238 | 4/1981 | United Kingdom .............. 376/271 |
| 2089554 | 6/1982 | United Kingdom .............. 376/364 |

*Primary Examiner*—Deborah L. Kyle
*Assistant Examiner*—Dan Wasil
*Attorney, Agent, or Firm*—Daniel C. Abeles

[57] ABSTRACT

A refueling machine (100) is provided with a latching-/unlatching rod (116) which is provided with a hexagonally configured head portion for mated engagement with a hexagonally configured socket (34) defined within a latching/unlatching screw (22) of a fuel assembly (10) whereby the fuel assembly (10) may be securely mechanically connected to the lower core support plate of the reactor internals. The latching/unlatching rod (116) is fixedly connected to a housing (118) which is co-axially disposed within a torque tube (140), the latter of which is fixedly secured to the lower end of a spur gear (130). The spur gear (130) is rotatably engaged with a drive spur gear (148) through means of an idler gear (128), whereby torque is transmitted to the torque tube (140). The torque tube (140) has a square-shaped configuration in cross-section, and the housing (118) has similarly configured flanged portion (144, 146) for co-operation therewith whereby rotary torque is transmitted to the housing (118) and the latching/unlatching rod (116). The housing (118), latching/unlatching rod (116), and torque tube (140) are all co-axially disposed within the refueling machine gripper tube (108) and outer stationary mast (102), and a dual winch drive system (112, 124) is provided for independently controlling the vertical movements of the gripper tube (108) and latching-/unlatching rod (116), respectively.

20 Claims, 4 Drawing Figures

FUEL ASSEMBLY UNLATCHING AND HANDLING GRIPPER

BACKGROUND OF THE INVENTION

1. Field of the Invention:

The present invention relates generally to nuclear reactor facilities, and more particularly to a system incorporated within the nuclear reactor refueling machine which is capable of remotely mechanically latching fuel assemblies to, and remotely mechanically unlatching the assemblies from, the lower core support plate of the reactor internals, in addition to being capable of conventionally gripping the core fuel assemblies as well as raising, lowering, or transporting the assemblies during the performance of refueling operations.

2. Description of the Prior Art:

As is well known in the nuclear reactor art, fuel, conventionally in the form of pellets, is inserted within suitable cladding material, and the composite assemblage of the fuel pellets and the cladding material or casings serve to define or form the nuclear reactor fuel rods. In turn, a predetermined number of fuel rods, assembled or secured together by means of bands called grid straps, serve to form or define a fuel element or fuel assembly, and a predetermined number of fuel elements or fuel assemblies serve to define or form the nuclear reactor core. As a result of the normal operation of the nuclear reactor facility, the nuclear fuel within the core fuel assemblies naturally becomes depleted, and consequently, the reactor core fuel assemblies must be periodically replaced and refueled. This is achieved by means of conventional refueling operations and techniques.

In particular, the fuel within the reactor core fuel assemblies is depleted over a predetermined period of time and at a predetermined consumption rate such that once an initially new reactor facility has attained its steady state fuel consumption activity or operation through means of having undergone, for example, an initial two-year stabilization period of operation, each fuel assembly utilized within the reactor core will have a service life of three years. In lieu of refueling the entire reactor core once every three years by replacing all of the core fuel assemblies with newly fresh fuel assemblies, maintenance requirements and economic considerations have dictated that the reactor core be refueled once per year, during which period the reactor facility is of course shut down. In order to achieve or accommodate such requisite refueling operations, the reactor core is sectionalized, and the fuel supply relatively staggered between the core sections or stages. Specifically, the reactor core fuel assemblies are effectively arranged within three groups, sections, or stages, including a first, central circular section, a second intermediate annular section disposed about the first central section, and a third outermost annular section disposed about the second intermediate annular section. In addition, as a result of the aforenoted initial two-year stabilization period of operation, at the end of any subsequent one-year period of operation, the nuclear fuel disposed within the fuel assemblies of the innermost or first central section of the reactor core, which fuel assemblies have been disposed within the reactor core for an operational period of three years, will have been substantially entirely depleted. Similarly, the nuclear fuel disposed within the fuel assemblies of the second intermediate or middle section of the reactor core, which fuel assemblies have been in operational service within the reactor core for a period of only two years, will be sufficient so as to permit such fuel assemblies to provide service within the reactor core for an additional period of one year. In a like manner, the nuclear fuel disposed within the fuel assemblies of the third outermost section of the reactor core, which fuel assemblies have been in operational service within the reactor core for a period of only one year, will be sufficient so as to permit such fuel assemblies to provide service within the reactor core for an additional period of two years. In accordance with conventional refueling techniques, then, the fuel assemblies from the innermost or central section of the core are removed from the reactor core for actual refueling with fresh or new fuel, while the fuel assemblies disposed within the intermediate or middle section of the core are transferred to the first central section of the core. Continuing further, the fuel assemblies disposed within the outermost third section of the core are transferred to the second intermediate or middle section of the core, while entirely new or fresh fuel assemblies are inserted into the outermost third section of the core, thereby completing the refueling operation of the reactor facility.

The fuel assemblies must of course be fixedly secured to the upper and lower core support plates of the reactor so as to be securely stabilized under the influence, for example, of the hydraulic forces attendant the coolant which is circulated throughout the reactor core during operation of the facility. However, in view of the foregoing requirements of the refueling operations, the assemblies must likewise be capable of being readily disconnected from the upper and lower core support plates so that the refueling operations may in fact be performed. In order to accomplish the foregoing attachment and stabilization goals, the fuel assemblies have been conventionally provided with suitable spring packs or assemblies. As the reactor facility technology has become more sophisticated, however, including, for example, an increase in coolant circulation requirements, the intensified hydraulic flow rates and forces attendant such increased coolant circulation requirements has correspondingly necessitated the need for increasingly more complex and costly spring packs or assemblies. Still further, while the fuel assemblies and core internals elements or structures of older generation reactor facilities were all fabricated from stainless steel, the fuel assemblies of the newer generation reactor facilities have been fabricated from zirconium in view of the lower neutron absorption characteristics of such material. As a result of this difference in materials, and the corresponding difference in the coefficients of thermal expansion characteristic of such materials, conventional fuel assemblies exhibit considerable thermal growth properties relative to the upper and lower core support plates. Consequently, the aforenoted spring assemblies or spring packs had to be modified further so as to include operational features which would permit the spring assemblies or spring packs to operationally accommodate such thermal growth properties, in addition to preserving the aforenoted attachment and stabilization requirements, of the fuel assemblies. These structural modifications have of course increased the complexity and cost factors of the fuel assembly spring packs still further.

In view of the foregoing, recent developments in nuclear reactor fuel assembly technology have resulted in the fabrication of fuel assemblies which can be mechanically connected, for example, to the lower core support plate of the reactor internals, and in this manner, the aforenoted complex and costly fuel assembly spring packs have been able to be eliminated. A need, however, exists for technology which will permit and facilitate the remote latching and unlatching of such mechanically-connectable fuel assemblies to and from the lower core support plate of the reactor internals.

Accordingly, it is an object of the present invention to provide a new and improved nuclear reactor refueling machine.

Another object of the present invention is to provide a new and improved nuclear reactor refueling machine which will satisfy the aforenoted need for technological apparatus which is capable of remotely latching and unlatching mechanically-connectable fuel assemblies to and from the lower core support plate of the reactor internals.

Yet another object of the present invention is to provide a new and improved nuclear reactor refueling machine which, in addition to its capability of remotely latching and unlatching mechanically-connectable fuel assemblies to and from the lower core support plate of the reactor internals, is also capable of gripping the fuel assemblies, and raising, transporting and lowering the fuel assemblies during the performance of a refueling operation within a nuclear reactor facility.

Still another object of the present invention is to provide a new and improved nuclear reactor refueling machine wherein all of the apparatus or equipment which is required for the performance of the various functions or procedures attendant a refueling operation, such as, for example, the gripping of a particular fuel assembly within the reactor core, the remote unlatching of the same from the lower core support plate of the reactor internals, the raising of the fuel assembly relative to the reator core, the transporting of the fuel assembly to a new core location as may be desired, the lowering of the fuel assembly into the new core location, the remote latching of the newly deposited fuel assembly to the lower core support plate, and the disconnection of the gripping mechanisms from the fuel assembly top nozzle, may be incorporated, in a substantially co-axial manner, within a single mast of the refueling machine.

SUMMARY OF THE INVENTION

The foregoing and other objectives of the present invention are achieved through the provision of a nuclear reactor refueling machine which, in accordance with the present invention, includes a conventional, vertically disposed outer or stationary mast suspendingly supported by means of a support tube mounted upon the refueling machine trolley, and a co-axially disposed inner mast or fuel assembly gripper tube which is telescopically movable in the vertical direction relative to, and within, the stationary outer mast.

The fuel assembly with which the apparatus of the present invention is operatively associated includes a vertically disposed latching/unlatching screw, the lower end of which is provided with an Acme thread for threadedly engaging a threaded female socket defined within an insert fixture fixedly secured within the lower core support plate so as to secure the fuel assembly to the lower core support plate. While the lowermost regions of the latching/unlatching screw is in the form of a substantially solid rod, the upper regions of the screw is in the form of a hollow tube, with the lower end of the tubular portion having a hexagonally shaped female socket defined therein. The tubular portion of the latching/unlatching screw serves as a guide tube for an extension or latching/unlatching rod vertically disposed in a co-axial manner upon the refueling machine and within the fuel assembly gripper tube, and the lower end of the latching/unlatching rod is provided with a hexagonally shaped male head for rotatably mating with the hexagonal socket of the latching/unlatching screw. The upper portion of the latching/unlatching rod is fixedly mounted within a substantially square-shaped housing which is, in turn, confined within a substantially square-shaped torque-transmitting tube. The torque tube has a spur gear fixedly mounted upon the upper end thereof, and the torque tube spur gear is engaged with another spur gear, which is mounted upon the outer stationary mast of the refueling machine, through means of an idler gear mounted upon the inner mast or gripper tube. Rotational drive is imparted to the stationary mast spur gear through means of a suitable motor mounted either upon the upper end of the stationary mast or upon the refueling machine trolley, and such rotary drive motion is transmitted to the torque tube-latching/unlatching rod assembly through means of the idler gear and torque tube spur gear. Consequently, a latching or unlatching operation can be performed depending upon the direction of the rotary drive imparted to the latching/unlatching rod-latching/unlatching screw assembly. Ratchet-type locking means is also provided within the top nozzle of the fuel assembly for engagement with the upper end of the fuel assembly latching/unlatching screw for preventing retrograde rotary motion of the screw once the screw is fully threadedly engaged within the lower core support plate fixture or adapter so as to prevent inadvertent unlatching of the screw and the fuel assembly from the lower core support plate.

BRIEF DESCRIPTION OF THE DRAWINGS

Various other objects, features, and attendant advantages of the present invention will be more fully appreciated as the same becomes better understood when considered in connection with the accompanying drawings, in which like reference characters designate like or corresponding parts throughout the several views, and wherein.

DESCRIPTION OF THE PREFERRED EMBODIMENT

Figure 1:
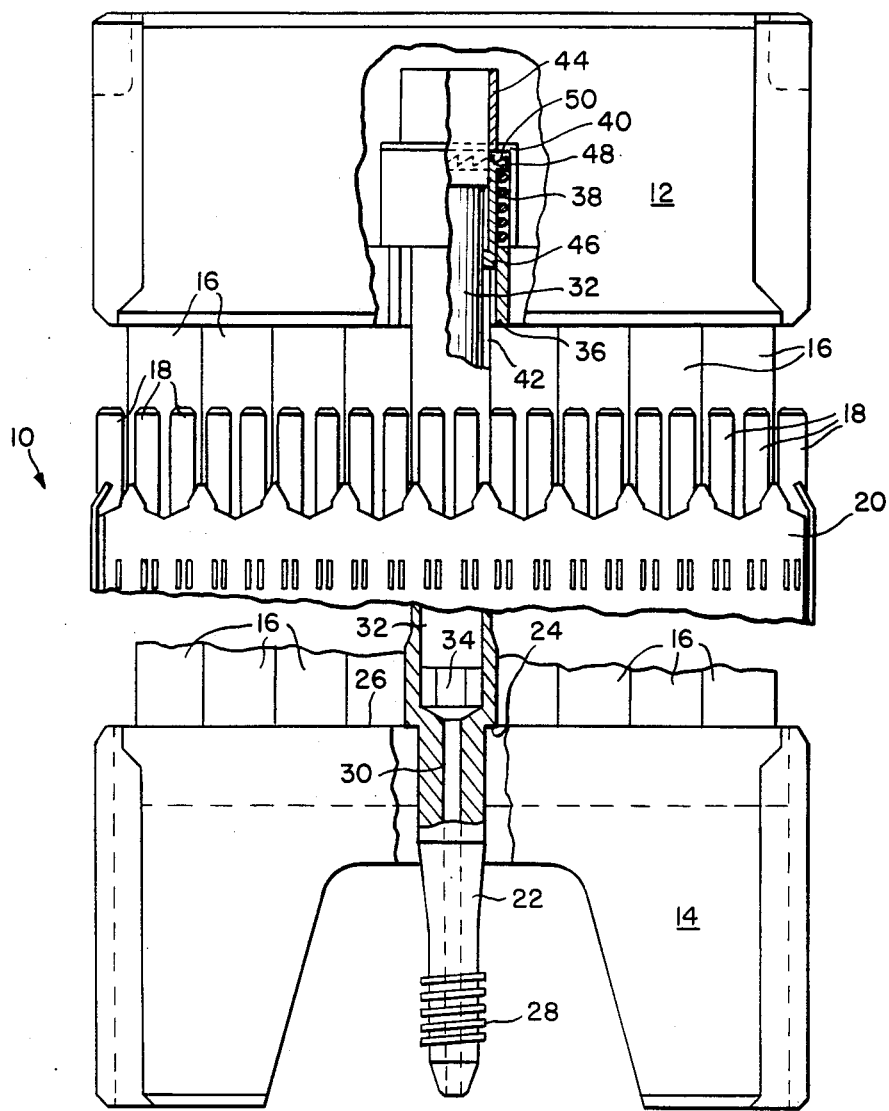
FIG. 1 is a side elevational view, partly in cross-section, of a fuel assembly which is capable of being mechanically connected to the lower core support plate of the reactor internals, and with which the apparatus of the present invention is operatively associated.

Referring now to the drawings, and firstly to FIG. 1 thereof, there is shown a fuel assembly, as generally indicated by the reference character 10, which is adapted to be mechanically connected to the lower core support plate, not shown, the nuclear reactor core internals. The fuel assembly 10 is seen to include a top nozzle 12 and a bottom nozzle 14 interconnected together by means of a plurality of vertically disposed thimble or guide tubes 16 within which the reactor control or moderator rods, not shown, may be periodically disposed. The fuel rods are shown at 18 and are conventionally retained within the fuel assembly 10 by means of grid straps 20, only one of which is shown in the figure.

In lieu of the centralmost guide or thimble tube 16 which is conventionally co-axially disposed within the fuel assembly 10, there is provided a latching/unlatching screw 22 which is vertically movable within the fuel assembly 10, although as shown in FIG. 1, screw 22 is disclosed as being in its lowermost vertical movement mode as determined by means of the engagement of an annular shoulder portion 24 with the upper surface 26 of fuel assembly bottom nozzle 14. The lower end of latching/unlatching screw 22 is provided with an external Acme thread portion 28 for engagement with a suitable internally threaded fixture or adapter, not shown, fixedly secured within the lower core support plate, also not shown, of the reactor internals. In this manner, when the latching/unlatching screw 22 is disposed within its lowermost mode as illustrated within FIG. 1, the fuel assembly 10 is securely mechanically latched to the lower core support plate of the reactor internals.

It is seen that the lowermost region of latching/unlatching screw 22 substantially comprises a solid rod, except that an axial bore 30 is defined therein for the passage of reactor coolant therethrough. The upper regions of the latching/unlatching screw 22, however, are fabricated in the form of an integral tubular member 32 which extends from the vicinity of the bottom fuel assembly nozzle 14 upwardly to within the vicinity of the top fuel assembly nozzle 12. The lower end of tubular member 32 is provided with a hexagonally configured female socket 34 which, as will be better appreciated hereinafter, serves to receive a similarly configured head portion of an extension or latching/unlatching rod which is vertically guided downwardly within tubular member 32 for mated engagement with socket 34. In this manner, torque applied to the latching/unlatching rod is transmitted to the latching/unlatching screw socket 34 by means of their respective hexagonally configured engaged portions, whereby latching/unlatching screw 22 may be threadedly mechanically connected or disconnected from the lower core support plate adapter or fixture, not shown, depending upon the direction in which the aforenoted torque is applied and transmitted.

The top nozzle 12 of the fuel assembly 10 is seen to include an annular adapter plate 36 fixedly secured in the lower end thereof and in a co-axial manner, and a coil spring 38 is seated atop adapter plate 36 and is disposed within a annular housing 40 fixedly secured to adapter plate 36. Plate 36, coil spring 38, and housing 40 all surround the upper end of guide tube 32, the latter of which is also provided with a pair of diametrically opposed, vertically extending slots or grooves 42, only one of which is shown. A locking sleeve 44 is annularly disposed about the upper end of guide tube 32 so as to be interposed between tube 32 and the assemblage comprising adapter plate 36, coil spring 38, and housing 40. The lower end of locking sleeve 44 is provided with a pair of diametrically opposed, radially inwardly projecting lugs 46, only one of which is shown, for slideable disposition within guide tube slot 42. A first set of annular ratchet teeth 48 are integrally provided upon the outer peripheral surface of locking sleeve 44 so as to extend vertically upwardly, and a second set of annular ratchet teeth 50 are integrally formed upon a radially inwardly projecting flange portion of housing 40 at the upper end thereof, teeth 50 extending vertically downwardly so as to be capable of mating with ratchet teeth 48. Ratchet teeth 48 are formed upon a radially outwardly extending flanged portion of locking sleeve 44, and the coil spring 38 is therefore axially interposed between this flange and adapter 36 in order to normally bias the locking sleeve 44 in the vertically upward direction. Consequently, in the absence of vertically downwardly directed pressure upon the upper end of locking sleeve 44, the ratchet teeth 48 and 50 will be engaged whereby relative rotation between the guide tube 32 and fuel assembly top nozzle 12 will be prevented. This in turn prevents relative rotation to be achieved between latching/unlatching screw 22, which is integrally formed with guide tube 32, and fuel assembly bottom nozzle 14 as well as the lower core support plate. Therefore, once latching/unlatching screw 22 has been fully threadedly engaged within the lower core support plate, retrograde threaded unlatching cannot inadvertently occur. Threaded unlatching of latching/unlatching screw 22 can of course be readily achieved by vertically downward pressure in fact being firstly applied to the upper end of locking sleeve 44 so as to disengage locking sleeve ratchet teeth 48 from housing teeth 50, such linear movement of sleeve 44 relative to housing 40 being permitted by means of the sleeve lugs 46 riding downwardly within guide tube slots 42 against the bias of spring 38. Rotational movement of the tube 32 and screw 22, relative to the fuel assembly 10, may then be performed in order to unlatch the screw 22 from the lower core support plate, not shown, so as to facilitate removal of the fuel assembly 10 from the reactor core.

Figure 2:
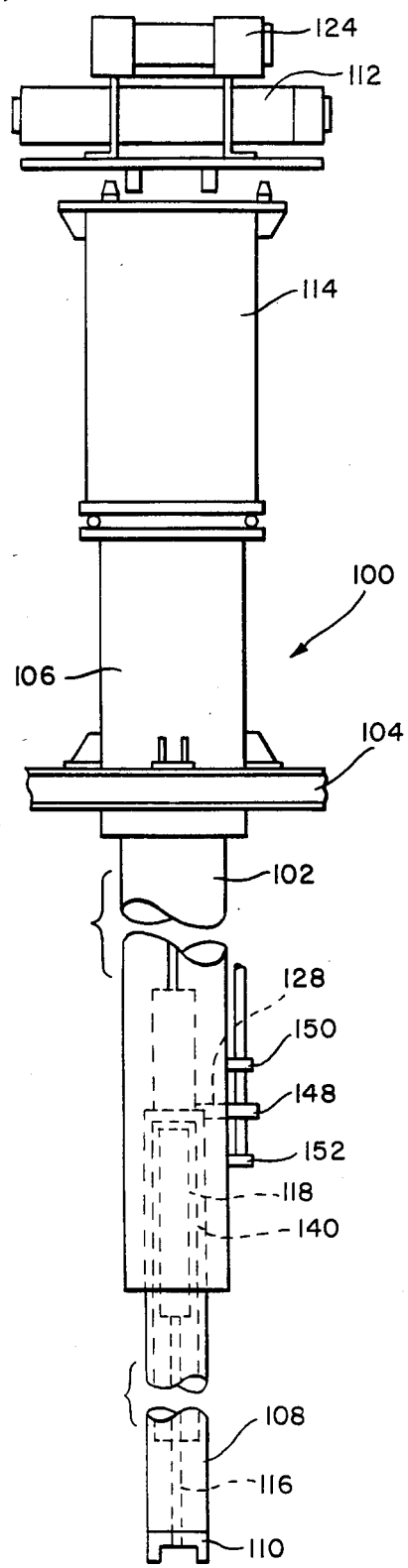
FIG. 2 is a schematic, side elevational view of the new and improved refueling machine of the present invention showing the various cooperative parts thereof which can engage the fuel assembly of FIG. 1 in order to latch or unlatch the same from the lower core support plate of the reactor internals.
Figure 3:
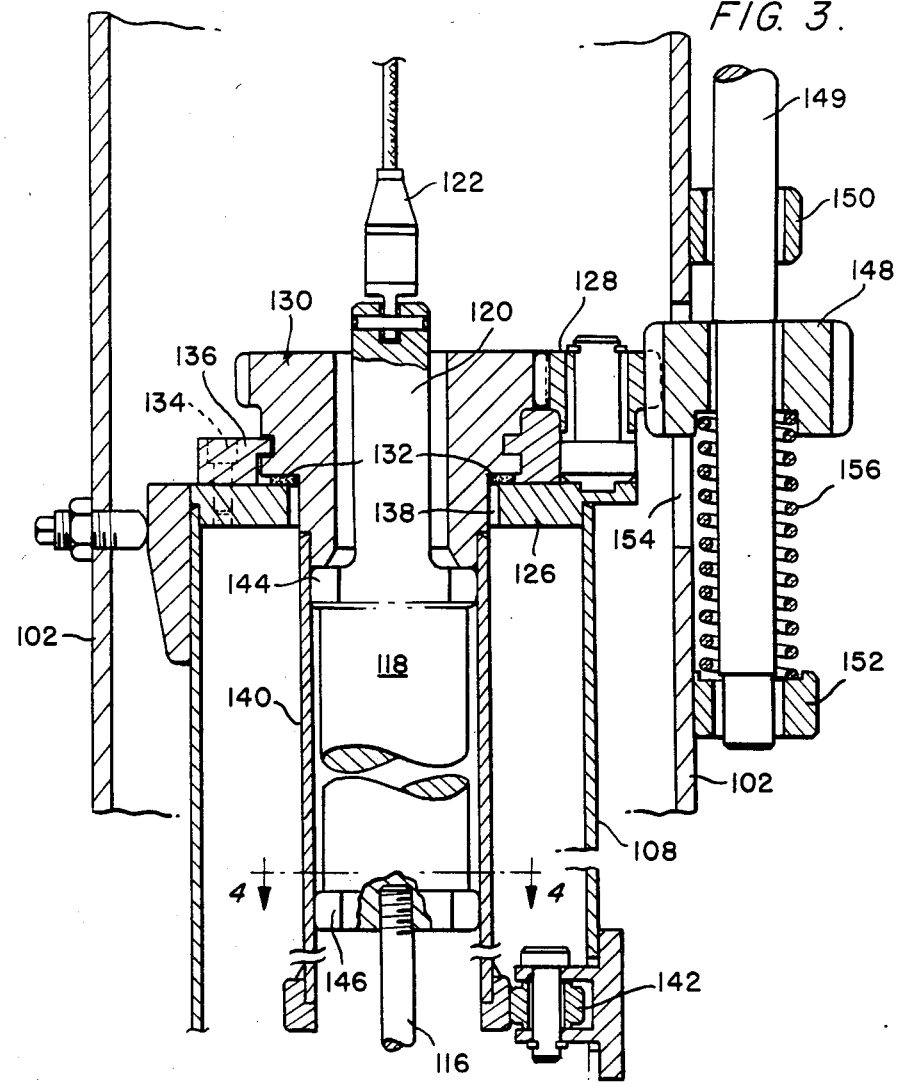
FIG. 3 is a vertical cross-sectional view of the torque drive system of the refueling machine of FIG. 2.
Figure 4:
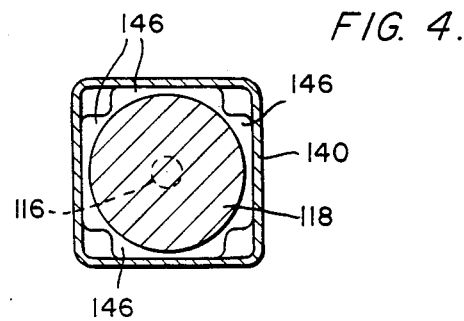
FIG. 4 is a horizontal cross-sectional view of the torque tube-latching/unlatching rod assembly of FIG. 3 as taken along the line 4—4 of FIG. 3.

Turning then to FIGS. 2-4, the new and improved refueling machine apparatus of the present invention, which will enable the aforenoted latching/unlatching mechanical connections between the fuel assembly 10 and the lower core support plate, not shown, to be achieved, will now be described. The refueling machine apparatus is generally indicated by the reference character 100 and is seen to include a conventional type stationary or outer mast 102 which is vertically suspended upon a conventional refueling machine support trolley 104 by means of a vertically disposed support tube 106. Support tube 106 and stationary mast 102 are of course co-axially disposed and, in turn, the refueling machine further includes a inner movable mast or gripper tube 108 which is co-axially disposed in a telescopic manner within outer mast 102. The lower end of gripper tube 108 is provided with suitable gripper mechanisms 110 for latching or gripping the top nozzle of of the fuel assembly 10, and the movement of gripper tube 108 is controlled by means of a suitable winch drive system 112. The drive system 112 is disposed atop suitable winch support column structure 114 which, in turn, is mounted atop the suptube 106.

In accordance with the particular remote-controlled latching/unlatching mechanical connection actuating system of the present invention, the refueling machine 10 is seen to further comprise a fuel assembly latching/unlatching rod 116 co-axially disposed within the gripper tube 108, and as best seen in FIGS. 3 and 4, the upper end of latching/unlatching rod 116 is fixedly secured within a cylindrical housing 118. The upper end of housing 118 is provided with an integral, vertically extending shaft portion 120 to which is fixedly connected a winch cable assembly 122. Vertical movement of housing 118 and latching/unlatching rod 116 is therefore controlled by means of a suitable latching/unlatching winch drive system 124 which is operatively connected to cable assembly 122. The latching/unlatching winch drive system 124 is disposed atop winch support column structure 114, and may be disposed along with the gripper tube winch drive system 112 in a suitably arranged dual-winch drive system, as may be desired, and as seen in FIG. 2.

As best seen in FIG. 3, the upper end of gripper tube 108 is closed by means of an end plate 126, and an idler gear 128 is rotatably supported upon end plate 126 at an eccentric location relative thereto. A spur gear 130 is rotatably mounted upon end plate 126 in a co-axial manner through means of thrust bearings 132. Spur gear 130 is seen to be enmeshed with idler gear 128, and suitable bolt fastening means 134 serve to axially retain spur gear 130 upon end plate 126 through means of flanged fixtures 136. Spur gear 130 annularly surrounds the upstanding shaft portion 120 of housing 118, and the axially extending, lower central portion of spur gear 130 projects downwardly through a central aperture 138 defined within end plate 126. In this manner, a substantially square-shaped torque tube 140 may be suspendingly fixedly supported from the lowermost end of spur gear 130 so as to extend downwardly within gripper tube 108 in a co-axial manner. Lateral stabilization of the lower end of torque tube 140 is provided by means of a plurality of equiangularly spaced, circumferentially arranged, roller mechanisms 142 fixedly secured within the sidewall portions of gripper tube 108, it being noted that only one such roller mechanism 142 is shown. It is further noted that while housing 118 has a substantially cylindrical configuration, the upper and lower ends thereof are provided with substantially square-shaped flanged portions 144 and 146, respectively, which project radially outwardly so as to engage the interior wall surfaces of torque tube 140, as also seen in FIG. 4. In this manner, relative rotation between housing 118 and its latching/unlatching rod 116, and torque tube 140, is prevented, while relative axial movement of housing 118 and rod 116 with respect to torque tube 140 is nevertheless permitted, the flanged portions 144 and 146 of housing 118 providing lateral stabilization for the upper and lower ends of housing 118 during its rectilinear translational movement within the torque tube 140.

In order to impart rotational drive to the idler gear 128 and spur gear 130, such that rotational torque is in turn transmitted to torque tube 140, housing 118, and latching/unlatching rod 116, another spur gear 148 is rotatably mounted upon a sidewall portion of stationary mast 102 by means of a motor drive shaft 149 which is mounted within suitable vertically spaced brackets 150 and 152. The upper end of drive shaft 149 is connected to a reversible motor drive system, not shown. The sidewall portion of stationary mast 102 is provided with an aperture 154 through which a peripheral portion of spur gear 148 projects so as to be capable of meshing with idler gear 128 when the gripper tube assembly 108 is lowered by means of winch drive system 112 so as to perform a remote-controlled latching or unlatching operation upon the fuel assembly 10 relative to the lower core support plate of the reactor internals, not shown. A coil spring 156 is co-axially disposed about drive shaft 149 so as to be interposed between the lower bracket 152 and spur gear 148 in order to bias spur gear 148 upwardly. The spring-biasing effect upon spur gear 148 also serves to facilitate the meshing of spur gear 148 and idler gear 128 when the gripper tube assembly 108 is moved downwardly in view of the fact that should the gears not properly mesh when idler gear 128 is moved downwardly with gripper tube 108, spur gear 148 will be forced downwardly against the biasing force of spring 156 whereupon a slight rotation of drive shaft 149 will cause spur gear 148 to be properly aligned with idler gear 128 for meshing therewith, coil spring 156 then biasing the spur gear 148 upwardly to its normal position as illustrated in the figure. The drive motor for shaft 149 may be mounted upon the stationary mast at an elevational level above the water within the core cavity, or alternatively, upon the refueling machine trolley.

In operation, when it is desired to remotely latch a fuel assembly 10 to the lower core support plate, the refueling machine 100 will of course be moved into its appropriate position relative to the core such that the fuel assembly 10 will be disposed above the space of the core into which the fuel assembly 10 is to be deposited or inserted. The fuel assembly 10 is of course at this time gripped by means of the gripper mechanisms 110 of the refueling machine 100, and the gripper tube winch drive 112 is actuated so as to lower the gripper tube 108, the gripper mechanisms 110, and the fuel assembly 10. When the fuel assembly 10 has been lowered such that the same is resting upon the lower core support plate, the gripper tube 108 is disposed in its position relative to stationary mast 102 as illustrated in FIG. 3. It is to be noted that at the same time, the winch drive 124 for the latching/unlatching rod 116 has also been accordingly actuated so as to maintain its relative position within gripper tube 108 as also illustrated in FIG. 3. Once the fuel assembly 10 is resting upon the lower core support plate, the winch drive 124 for the latching/unlatching rod 116 may be actuated further such that the lower end of rod 116 will be engaged within the hexagonally configured socket 34 of latching/unlatching screw 22, it being remembered that the lower end of latching/unlatching rod 116 is provided with a similarly hexagonally configured head portion, not shown. Further lowering of the winch drive 124 and the latching/unlatching rod-latching/unlatching screw assembly causes translational movement of the rod 116 and its housing 118 relative to torque tube 140, as well as similar linear translational movement of screw 22 relative to the fuel assembly 10, and particularly, bottom nozzle portion 14 thereof. Upon initial engagement of the screw 22 with the female adapter, not shown, of the lower core support plate, rotary drive is imparted to the spur gear 148 through means of its rotary drive shaft 149 and its reversible drive motor, not shown. Such rotational drive torque is of course transmitted to idler gear 128 and spur gear 130 whereby rotation is imparted to torque tube 140. As a result of the square-shaped configurations of tube 140 and latching/unlatching rod housing 118, housing 118 and rod 116 are caused to rotate whereby latching/unlatching screw 22 is caused to threadedly engage the female adapter, not shown, of the lower core support plate. Screw 22 at this time also translates relative to fuel assembly 14 until such time that the latching-/unlatching screw 22 is fully threadedly engaged within the lower core support plate adapter. At such time, the screw 22 will be disposed relative to fuel assembly 10 as shown in FIG. 1, with the shoulder portion 24 of screw 22 engaged with the upper surface 26 of fuel assembly bottom nozzle 14. During this threading engagement period, rod 116 and housing 118 also translate relative to torque tube 140. It is lastly noted that in conjunction with the latching procedure, rotational movement of the latching screw 22 and its guide tube 32 will not be prevented by means of the locking sleeve 44 and the ratchet teeth 48 and 50 due to the fact that the ratchet teeth 48 will in fact ratchet over teeth 50, and when the threaded latching procedure is complete, the ratchet teeth 48 and 50 are engaged under the influence of biasing spring 38 so as to prevent retrograde rotation of guide tube 32 and latching screw 22 relative to the fuel assembly top nozzle 12 whereby inadvertent unlatching of the screw 22 and the fuel assembly 10 from the lower core support plate is positively prevented. Upon completion of the threaded latching procedure, the latching-/unlatching rod 116 and its housing 118 may be raised by means of winch drive 124 to their position illustrated within FIG. 3, the gripper mechanisms 110 may be disengaged from the fuel assembly top nozzle 12, and the gripper tube assembly 108 raised by means of its winch drive 112.

In performance of an unlatching operation, the precise reverse procedures are accomplished with the exception that the ratchet teeth 48 and 50 must be initially disengaged so as to in fact permit torque application to the guide tube 32 and unlatching screw 22 in the direction opposite that of the latching operation. Such disengagement of the ratchet teeth 48 and 50 can be accomplished by suitable means, not shown, disposed upon the gripper tube assembly 108 and incorporated, for example, within the gripper mechanisms 110. Once the fuel assembly 10 has been gripped by the mechanisms 110, and the ratchet teeth 48 and 50 disengaged, unlatching rod 116 may be lowered into guide tube 32 for engagement with unlatching screw socket 34. Torque is then applied to unlatching rod 116 in the direction reverse of that of the latching operation whereby unlatching screw 22 is threadedly disengaged or disconnected from the lower core support plate. Screw 22 therefore also moves axially upwardly relative to bottom fuel assembly nozzle 14, and rod 116 and housing 118 similarly move axially upwardly relative to torque tube 140. Once threaded unlatching is completed, rod 116 is of course entirely withdrawn from guide tube 32, and the rod 116 and housing 118 are raised to their positions shown in FIG. 3. The unlatched fuel assembly 10 may then be lifted out from the reactor core by means of vertical upward movement of gripper tube 108.

Obviously, many modifications and variations of the present invention are possible in light of the above teachings. It is therefore to be understood that within the scope of the appended claims, the present invention may be practiced otherwise than as specifically described herein.

We claim:

1. A refueling system for a nuclear reactor facility, comprising:
    a refueling machine, comprising an outer stationary mast and a vertically movable inner mast, for removing and inserting fuel assemblies from and into the reactor core of said facility;
    means mounted upon each of said fuel assemblies for engaging and disengaging support structure within said nuclear reactor core so as to fixedly connect and disconnect said each of said fuel assemblies to and from said nuclear reactor core upon insertion and removal of said each of said fuel assemblies within and out of said nuclear reactor core;
    means mounted upon said vertically movable inner mast of said refueling machine for gripping said each of said fuel assemblies so as to facilitate the transportation of said each of said fuel assemblies during said insertion and removal of said each of said fuel assemblies into and out of said nuclear reactor core;
    first rotary drive means mounted upon said outer stationary mast of said refueling machine; and
    second rotary drive means, separate and distinct from said gripping means, mounted upon said vertically movable inner mast of said refueling machine for engaging said first rotary drive means of said outer stationary mast and actuating said connecting and disconnecting means mounted upon said each of said fuel assemblies independently of the operation of said gripping means mounted upon said vertically movable inner mast of said refueling machine.

2. A refueling system as set forth in claim 1, wherein:
    said connecting and disconnecting means of said any one of said fuel assemblies comprises a threaded screw.

3. A refueling system as set forth in claim 2, wherein:
    said threaded screw has hexagonal socket means defined therein; and
    said second rotary drive means includes a hexagonally headed rod for engagement within said hexagonal socket means of said threaded screw.

4. A refueling system as set forth in claim 3, wherein:
    said second rotary drive means comprises gear means operatively connected to said rod.

5. A refueling system as set forth in claim 4, wherein:
    said first rotary drive means comprises a first gear rotatably mounted upon said stationary mast, and said second rotary drive means comprises a second gear operatively connected to said rod and said first gear for transmitting torque from said first gear to said rod.

6. A refueling system as set forth in claim 4, further comprising:
    tube means connected to said gear means and operatively connected to said rod for transmitting torque from said gear means to said rod.

7. A refueling system as set forth in claim 6, wherein:
    said rod is disposed within a housing having substantially square-shaped regions in cross-section; and
    said tube means is substantially square in cross-section whereby torque can be transmitted therebetween.

8. A refueling system as set forth in claim 1, wherein:
    said connecting and disconnecting means is co-axially disposed with respect to said stationary mast and said inner mast.

9. A refueling system as set forth in claim 1, further comprising:
    first winch drive means for vertically controlling the displacement of said inner mast; and
    second winch drive means for vertically controlling the displacement of said connecting and disconnecting means independently of said first winch drive means.

10. A refueling system as set forth in claim 1, further comprising:

means disposed upon said any one of said fuel assemblies for preventing inadvertent disconnection of said any one of said fuel assemblies from said support structure.

11. A refueling system as set forth in claim 10, wherein said means for preventing inadvertent disconnection, comprises:
   first ratchet means disposed upon said any one of said fuel assemblies;
   said connecting means of said any one of said fuel assemblies comprises a threaded screw; and
   second ratchet means disposed upon said threaded screw for cooperation with said first ratchet means.

12. A refueling system as set forth in claim 11, further comprising:
   slot means defined within said threaded screw; and
   sleeve means slideably disposed upon said threaded screw and having means engaged within said slot means for preventing relative rotation between said screw and said sleeve means;
   said second ratchet means being disposed upon said sleeve means whereupon said threaded screw is prevented from rotating relative to said any one of said fuel assemblies when said first and second ratchet means are engaged and when torque is applied to said screw in a direction tending to force said ratchet teeth into relative engagement.

13. A refueling system as set forth in claim 11, further comprising:
   spring biasing means for tending to maintain said ratchet teeth engaged.

14. A refueling system for a nuclear reactor facility, comprising:
   a refueling machine, comprising an outer stationary mast and an inner mast vertically movable between a raised post-removal or pre-insertion position and a lowered insertion or pre-removal position, for removing and inserting fuel assemblies from and into the reactor core of said facility;
   means rotatably mounted upon each of said fuel assemblies for engaging and disengaging support structure within said nuclear reactor core so as to fixedly connect and disconnect said each of said fuel assemblies to and from said nuclear reactor core upon insertion and removal of said each of said fuel assemblies within and out of said nuclear reactor core;
   means mounted upon said vertically movable inner mast of said refueling machine for gripping said each of said fuel assemblies so as to facilitate transportation of said each of said fuel assemblies during said insertion and removal of said each of said fuel assemblies into and out of said nuclear reactor core;
   first rotary drive means mounted upon said outer stationary mast of said refueling machine; and
   second rotary drive means, separate and distinct from said gripping means, rotatably mounted upon said vertically movable inner mast of said refueling machine for rotatably engaging said first rotary drive means of said outer stationary mast when said inner mast is disposed at said lowered position and actuating said connecting and disconnecting means rotatably mounted upon said each of said fuel assemblies independently of the operation of said gripping means mounted upon said vertically movable inner mast of said refueling machine.

15. A refueling system as set forth in claim 14, wherein:
   said connecting and disconnecting means of said each one of said fuel assemblies comprises a theaded screw.

16. A refueling system as set forth in claim 15, wherein:
   said first rotary drive means comprises a first gear; and
   said second rotary drive means comprises a second gear operatively engaged with said first gear.

17. A refueling system as set forth in claim 16, wherein:
   said threaded screw is provided with a hexagonal socket; and
   said second rotary drive means comprises a torque tube fixed to said second gear and having a square-shaped configuration, and a rod assembly the lower portion of which comprises a rod having a hexagonally-shaped head portion for engagement with said hexagonal socket of said threaded screw, and the upper portion of which has a square-shaped means for engagement with said torque tube so as to transmit torque from said second gear and said torque tube to said rod and said threaded screw.

18. A refueling system as set forth in claim 17, wherein:
   said outer stationary mast, said inner vertically movable mast, said torque tube, said rod, and said threaded screw are all substantially co-axially disposed with respect to each other.

19. A refueling system as set forth in claim 16, further comprising:
   slot means defined within a sidewall portion of said outer stationary mast; and
   said first gear is mounted substantially externally of said outer stationary mast with a radial portion of said first gear projecting through said slot means of said outer stationary mast so as to be engageable with said second gear of said second rotary drive means.

20. A refueling system for a nuclear reactor facility, comprising:
   a refueling machine, comprising an outer stationary mast and a vertically movable inner mast, for removing and inserting fuel assemblies from and into the reactor core of said facility;
   means mounted upon each of said fuel assemblies for engaging and disengaging support structure within said nuclear reactor core so as to fixedly connect and disconnect said each of said fuel assemblies to and from said nuclear reactor core upon insertion and removal of said each of said fuel assemblies within and out of said nuclear reactor core;
   means mounted upon said vertically movable inner mast of said refueling machine for gripping said each of said fuel assemblies so as to facilitate transportation of said each of said fuel assemblies during said insertion and removal of said each of said fuel assemblies into and out of said nuclear reactor core;
   first rotary drive means mounted upon said outer stationary mast of said refueling machine; and
   second rotary drive means, separate and distinct from said gripping means yet coaxially mounted therewith, upon said vertically movable inner mast of said refueling machine for engaging said first rotary drive means of said outer stationary mast and actuating said connecting and disconnecting means mounted upon said each of said fuel assemblies independently of the operation of said gripping means mounted upon said vertically movable inner mast of said refueling machine.

* * * * *